(12) United States Patent
Kreider et al.

(10) Patent No.: US 6,955,250 B2
(45) Date of Patent: Oct. 18, 2005

(54) APPARATUS FOR DAMPING VIBRATION USING MACRO PARTICULATES

(75) Inventors: Thomas R. Kreider, Mesa, AZ (US); Steve L. Hadden, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/728,225

(22) Filed: Dec. 3, 2003

(65) Prior Publication Data

US 2005/0121270 A1    Jun. 9, 2005

(51) Int. Cl.[7] ................................................. F16F 9/30
(52) U.S. Cl. ..................................................... 188/268
(58) Field of Search ................................ 188/268, 269, 188/267.1, 267.2, 151, 140.3

(56) References Cited

U.S. PATENT DOCUMENTS

| | | | | |
|---|---|---|---|---|
| 1,294,467 | A | * | 2/1919 | Hovas ......................... 188/268 |
| 2,417,347 | A | * | 3/1947 | Brown ......................... 188/268 |
| 4,504,044 | A | * | 3/1985 | Shtarkman ................... 188/268 |
| 4,576,366 | A | * | 3/1986 | Gallas et al. ................ 188/268 |
| 4,679,775 | A | * | 7/1987 | Funaki et al. ............. 188/267.2 |
| 4,744,604 | A | * | 5/1988 | Lewis et al. ................. 188/268 |
| 4,842,106 | A | * | 6/1989 | Ludwig et al. .............. 188/266 |
| 5,816,373 | A | | 10/1998 | Osterberg et al. |
| 5,979,882 | A | | 11/1999 | Osterberg |
| 6,129,185 | A | | 10/2000 | Osterberg et al. |
| 6,152,272 | A | * | 11/2000 | Agnihotri et al. ........ 188/267.2 |
| 6,224,341 | B1 | * | 5/2001 | Fricke ......................... 188/268 |
| 6,543,590 | B1 | * | 4/2003 | Monson ....................... 188/268 |

* cited by examiner

*Primary Examiner*—Douglas C. Butler
*Assistant Examiner*—Melanie Torres

(57) ABSTRACT

A mass damping system for use in all temperature ranges, including extreme temperature environments, is provided. The system comprises a housing having bottom, side and end walls, and an inner peripheral surface that defines an interior, a mounting mechanism located on the housing, configured to mount the housing to the mass, and macro-particles disposed within the housing interior able to flow within the housing and simulate a liquid.

21 Claims, 3 Drawing Sheets

APPARATUS FOR DAMPING VIBRATION USING MACRO PARTICULATES

FIELD OF THE INVENTION

The present invention generally relates to vibration damping and isolation, and more particularly relates to an apparatus that uses macro-particles, without liquid media, to dampen vibration.

BACKGROUND OF THE INVENTION

A precision structural system carrying a load, such as a telescope, may be susceptible to disturbances that produce structural vibrations. Such vibrations may be contributed to the structural system by components or assemblies, such as reaction wheel assemblies that are used to point the system vehicle. For the most part, because these systems tend to not have inherent damping mechanisms, these structural vibrations may cause degradation of the system and system performance over time. Therefore, an efficient means of damping the system may be needed.

Typically, to minimize performance degradation caused by vibrations, a passive mass damping and isolation system has been used for damping and isolating the lad carried by a precision isolation system. One type of passive mass damping and isolation system is a fluid damper. Fluid dampers operate by displacing a viscous fluid from one fluid reservoir to another fluid reservoir through a restrictive passage. Shearing of the viscous fluid as it flows through the restrictive passage provides a damping force that is proportional to velocity.

In these types of dampers, the viscous fluid is typically water, oil, or any one of numerous other fluid substances that are not in the gas, plasma, or solid phase. Although these fluids may be used in damping mechanisms that operate in environments where the fluid temperature is in liquid phase temperature range, once the fluid deviates out of this range, the fluid can begin to change state. For instance, in the aerospace context where damping mechanisms may be exposed to temperatures that approach 0° Kelvin, most of the fluids used in fluid dampers lose viscosity and/or phase change from a fluid to a solid.

In other types of dampers, such as pneumatic fluid mass dampers, fluids such as gases, are used. Pneumatic fluid mass dampers operate by varying pressure, temperature and gas viscosity. However, in the aerospace context at 0° Kelvin, gas to liquid phase changes may occur. Such changes are generally undesirable because when the gas changes into a liquid, the resulting volume of liquid and gas may not adequately absorb the system vibration and instead may begin to vibrate itself.

Accordingly, there is a need for an improved vibration damping system that can be used in most temperature ranges, and in particular in extreme cryogenic temperature environments, such as 0° Kelvin or extreme heat environments. In addition, it is desirable to maintain a weight, size, and complexity efficient structure, as well as improve the integrity of the structure. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for damping vibration using a mass damper. The apparatus comprises a mass damping system having a housing that includes bottom, side and end walls that define an interior and macro-particles disposed within the interior.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1A:
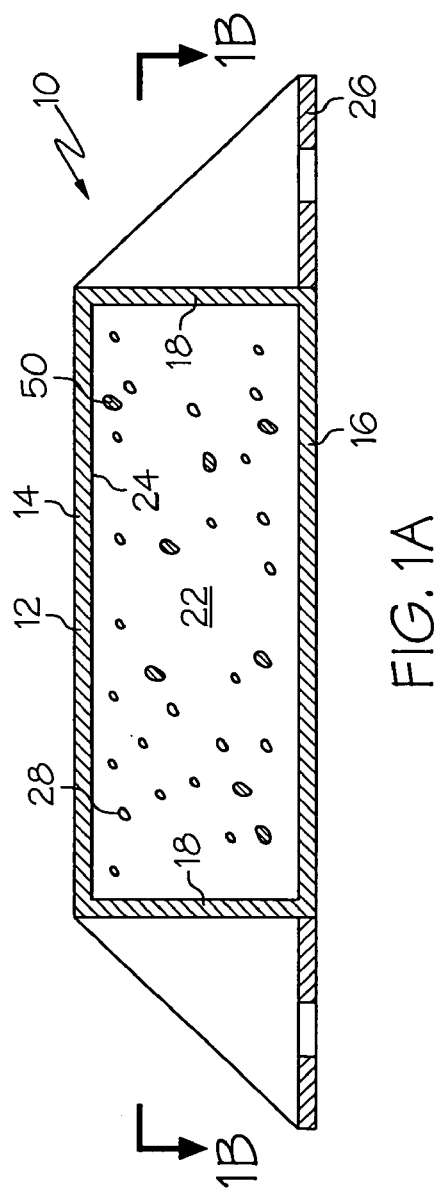
FIG. 1A illustrates a cross sectional view of amass damping system in accordance with a first exemplary embodiment of the invention.
Figure 1B:
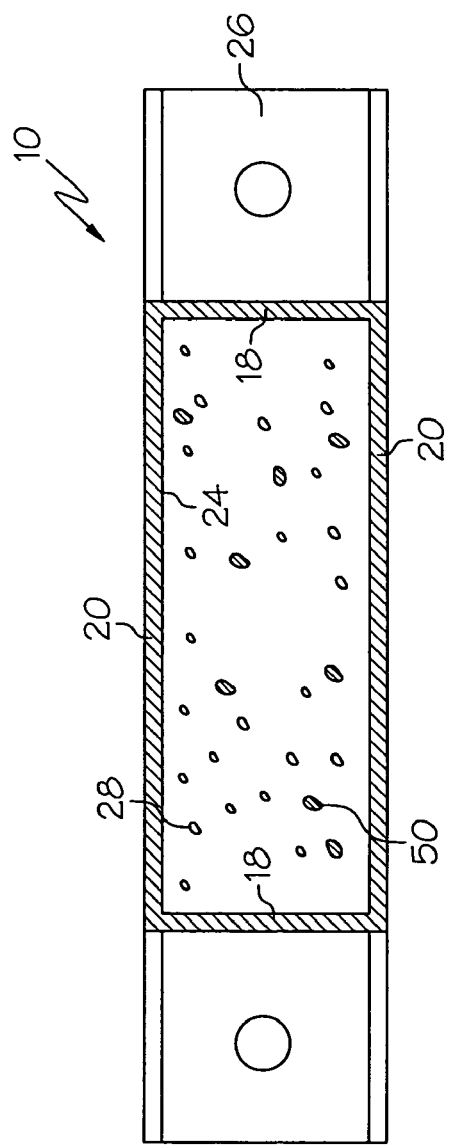
FIG. 1B illustrates a top view of the mass damping system taken along line 1B—1B of FIG. 1 in accordance with the first exemplary embodiment.

Simplified views of an exemplary mass damping system 10 according to an exemplary embodiment are provided in FIGS. 1A and 1B. A simplified cross sectional view of system 10 is provided in FIG. 1A, while a top view of the system 10 is illustrated in FIG. 1B. With reference to FIGS. 1A and 1B, the damping system 10 includes a housing 12 having a top, bottom and side walls 14, 16, 18 that together define an interior chamber 22. The walls 14, 16, 18 also define an inner peripheral surface 24. Located adjacent the housing 12 are mounting mechanisms 26 that are configured to mount the system 10 to a stationary mass 11 susceptible to vibration (shown in FIG. 3).

Macro-particles 28 are disposed within the housing interior chamber 22 and work with the housing 12 to damp the vibration of a vibrating load. Specifically, the interior chamber 22 is filled with macro-particles 28 intended to absorb the movement resulting from the force exerted on mass 11. To this end, each macro-particle preferably has properties that allow it to act with the other macro-particles so as to simulate a homogenous fluid with inherent shear. Thus, the macro-particles are preferably small particles that together act to simulate a liquid. Several factors are preferably considered in selecting and/or processing the appropriate macro-particle. These factors include macro-particle geometry, macro-particle size, and the physical properties, such as elasticity, thermal and/or chemical stability, of the material from which the macro-particles are to be processed. Each of these factors will now be discussed.

In general, macro-particles having a smooth or substantially smooth, as opposed to fractured or substantially fractured, surfaces are more preferable so as to aid in preventing the macro-particles from clumping. Additionally, smooth-surfaced macro-particles may be preferable to avoid increased wear and tear of the mass damping system components. Most preferably the selected macro-particles have a shape and form that generally do not act as coarse abrasives against the inner peripheral surface 24. The macro-particles are preferably substantially orb-shaped, so as to more easily slide past one another to simulate molecules in a liquid state.

The macro-particle size can be considered in conjunction with the shape of the macro-particle. For instance, smooth-surfaced, orb-shaped macro-particles can be a few microns in size or, alternatively, can be single-atom solids that can, in whichever size, work together to substantially mimic the behavior of liquid. In such case, the macro-particles can also be single-atom solids. Many macro-particles inherently have small van der Waals forces that may cause them to be attracted to each other, thus a stirring mechanism is preferably employed to aid in preventing clumping (described in further detail below). Macro-particles that may have a more fractured surface or that may not be orb-shaped may be larger in size. For certain mass dampers, it may be desirable to include a mixture of macro-particles having several different macro-particle sizes. Examples of such types of macro-particles include ground graphite, vacuum-sputtered metals, or polished ceramic powder, and any other known type of mixture of macro-particles having different sizes.

Naturally occurring macro-particles having the desired aforementioned characteristics may be used, but depending on the material selection, the macro-particles can be processed to possess the desired characteristics mentioned above as well. Materials that produce macro-particles that are chemically and thermally stable and wear resistant, when the macro-particles collide with one another are most preferred. Such preferable materials include, but are not limited to, graphite (carbon black), alumina ($Al_2O_3$), titanium dioxide ($TiO_2$), and titanium. These materials may be crushed, pulverized into power or dust, sputtered or processed by any other manner known in the art to produce small macro-particles having the desired geometry, size and shape. Alternatively, the macro-particles can include metal-coated ceramics or ceramic-coated metals having the desired balance of elasticity, conductivity, wear resistance and thermal stability. The macro-particles can include macro-particles processed from a single material or more than one material, or can be a mixture of macro-particles each processed from different material.

As previously mentioned, to further aid in the prevention of clumping and/or congregation of macro-particles, a stirring mechanism 50 is employed. Stirring mechanism 50 comprises orb-shaped grains that are preferably relatively larger in size than the macro-particles. Thus, when the mass damping system 10 is agitated, the grains of the stirring mechanism 50 move through the smaller macro-particles in the volume of macro-particles 28 thereby stirring and mixing the macro-particles 28. Stirring mechanism 50 can also be non-orb shaped grains, or any other known macro-particles that are capable of stirring the volume of macro-particles 28 when the mass damping system 10 is agitated. Alternatively, stirring mechanism 50 can be a component within the system 10 that mechanically stirs the volume of macro-particles 28, such as rods, dowels, pinwheels or any other known mechanical stirrer that are fixed to the system housing 12.

Figure 2A:
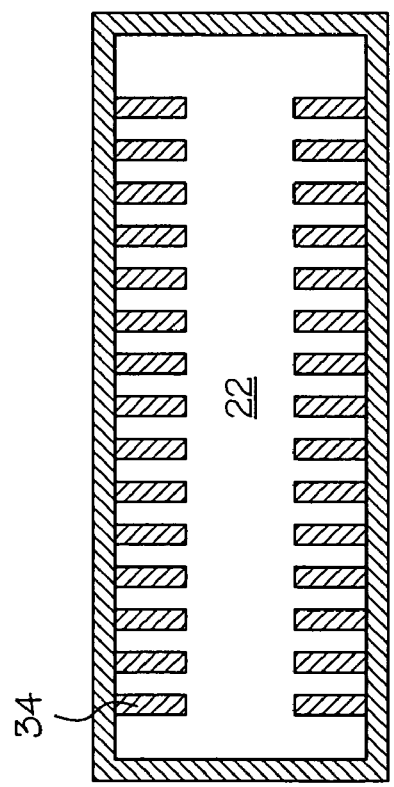
FIG. 2A illustrates a top view of a mass damping system taken along line 1B—1B of FIG. 1 in accordance with a second exemplary embodiment.
Figure 2B:
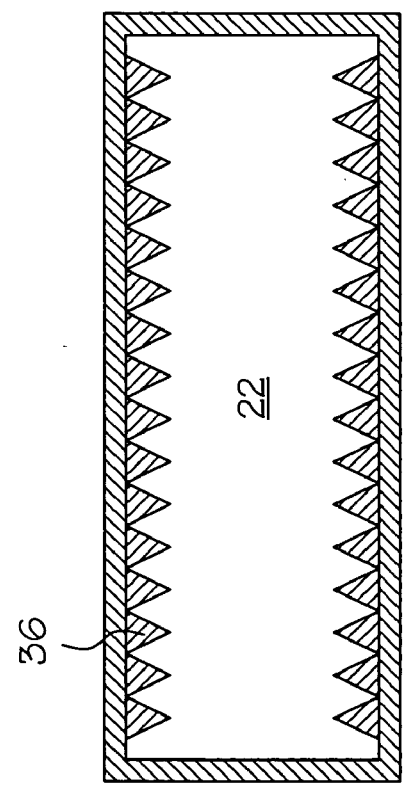
FIG. 2B illustrates a top view of a mass damping system taken along line 1B—1B of FIG. 1 in accordance with a third exemplary embodiment.

To further aid in the prevention of clumping, the system 10 can include baffling or wall texture, as shown in FIGS. 2A and 2B. FIGS. 2A and 2B illustrate top views of mass damping system 10 taken along line 1B—1B in FIG. 1, according to two exemplary embodiments. In both FIGS. 2A and 2B, one or more protrusions of some sort are coupled to the inner peripheral surface 24 of the system housing 12. The protrusion can take any one of numerous shapes. For example, in FIG. 2A, washer-shaped baffles 34 are depicted. When the macro-particles 28 move about within the housing interior chamber 22, the volume of macro-particles 28 is divided by the washer-shaped baffles 34. Thus, the washer-shaped baffles 34 act to disrupt the flow of the macro-particles to thereby prevent clumping. FIG. 2B illustrates another exemplary embodiment wherein surface texture 36 that is located on the side walls 16 is employed. The surface texture 36 in this embodiment is substantially triangular in shape, and can be formed into the housing walls 14, 16, 18 in any known manner or coupled thereto.

In all of the embodiments, including those depicted in FIGS. 1–2B, the inner peripheral surface of walls 14, 16, 18, and in the case of FIGS. 2A and 2B, the baffles 34 or surface texture 36, are polished to enhance surface smoothness and/or heat-treated for hardness to increase the robustness of the structure. This is preferably performed to further prevent clumping and reduce possible contamination of the fluid with skarf due to wear. Such treatment is preferably applied to the components of the mass damper 10 that are able to be treated and that are in contact with the volume of macro-particles 28. Any other known treatment to enhance surface smoothness or hardness or method or treatment to increase structural robustness can be employed as well.

Figure 3:
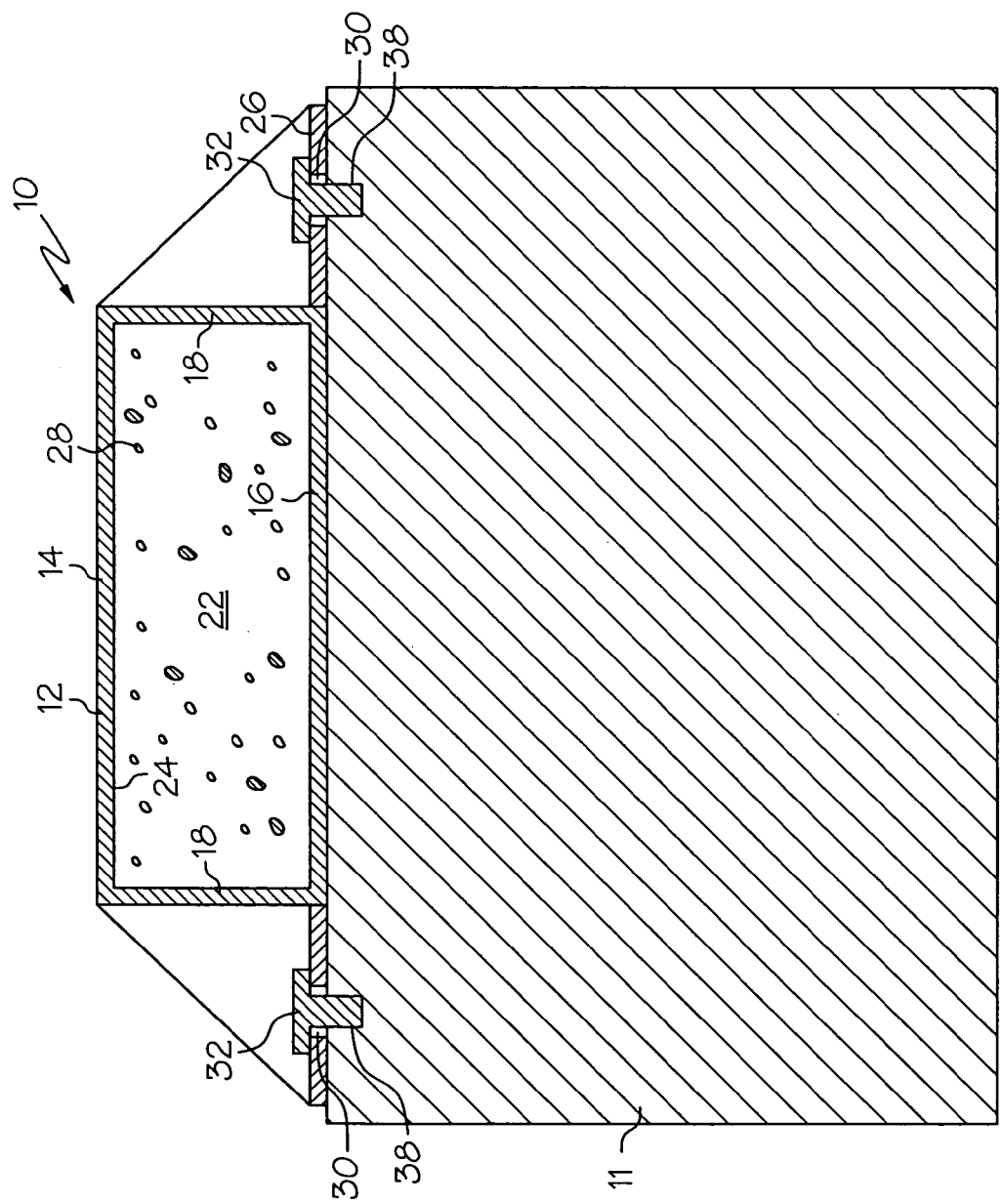
FIG. 3 illustrates a cross-sectional view of the mass damping system of FIG. 1 mounted to a stationary mass.

FIG. 3 illustrates the mass damping system 10 mounted to a load or a stationary mass 11 that is susceptible to vibration. As previously mentioned, the load or stationary mass 11 is mounted to the mass damping system housing 12 via a mounting mechanism 26. The mounting mechanism 26 in this embodiment is bolted to the housing 12, however, the mechanism 26 and housing 12 can be coupled together in any fashion known to those skilled in the art. Alternatively, the mounting mechanism 26 can be formed from or in the housing 12 such that the mechanism 26 protrudes from or is located in any one of the housing walls 14, 16, 18. Additionally, although the depicted embodiment illustrates two mounting mechanism 26, any number of mechanisms may be used so long as the system 10 can be securely mounted to the mass 11.

Turning back to FIG. 3, the mounting mechanism 26 includes a plurality of bores 30 that correspond to a plurality of cavities 38 configured to receive a screw or bolt 32 to mount the mechanism 26 on to the stationary mass 11. When a force is exerted on mass 11 that causes the mass to vibrate, the kinetic energy from the mass vibration is transferred to system 10. The kinetic energy/vibration travels from the mass 11, to the system housing 12, and then, into the housing chamber 22. Once the kinetic energy reaches the chamber 22, it is transferred to the macro-particles 28 within the chamber 22. The macro-particles 28 collide with one another and the chamber walls 14, 16, 18, thereby dissipating the kinetic energy as heat and thus, damping the load vibration. Because most of the macro-particle collisions occur out of phase with each other, the collisions do not contribute to further vibration of the system 10.

Although FIG. 2 depicts the system 10 mounted on top of the stationary mass 11, it will be understood that the system 10 may also be mounted under the stationary mass 11 or any other position adjacent the mass 11.

Thus, an improved mass damping system has been provided that can be used in all ranges of temperatures, including extreme temperature environments, such as about 0° Kelvin or extreme heat environments. The mass damping system of the invention maintains size and complexity efficiency as well as improves the integrity of the structure.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for damping vibration of a mass, comprising:
    a housing having at least an outer peripheral surface configured to mount to the mass, and an inner peripheral surface that defines an interior space, the inner peripheral surface configured to be substantially smooth; and
    macro-particles disposed within the housing interior space, the macro-particles comprising material being substantially thermally stable, substantially chemically stable, and substantially wear-resistant in temperatures at least as low as about 0° Kelvin and having substantially smooth surfaces to thereby flow in the housing interior space and simulate a fluid.

2. The system of claim 1, wherein the macro-particles comprise macro-particles that are substantially orb-shape.

3. The system of claim 1, wherein the macro-particles further comprise macro-particles having substantially fractured surfaces.

4. The system of claim 1, further comprising:
    at least one protrusion located on the housing inner peripheral surface to disrupt macroparticle flow.

5. The system of claim 4, wherein the protrusion comprises a baffle located on the housing inner peripheral surface.

6. The system of claim 5, wherein the baffle is washer-shaped.

7. The system of claim 5, wherein the baffle is formed on the housing inner surface.

8. The system of claim 5 wherein the baffle is coupled to the housing inner surface.

9. The system of claim 4, wherein the at least one protrusion comprises a surface texture formed on the housing inner peripheral surface.

10. The system of claim 1, wherein the macro-particles comprise macro-particles that are about 1 $\mu$m to 1 mm in size.

11. The system of claim 1, wherein the macro-particles comprise single atom macro-particles.

12. The system of claim 1, wherein the material is graphite.

13. The system of claim 1, wherein the material is aluminum oxide.

14. The system of claim 1, wherein the macro-particles comprise a mixture of macro-particles, each macro-particle processed from a different material.

15. The system of claim 1, wherein the macro-particles comprise macro-particles processed from more than one material.

16. The system of claim 15, wherein the macro-particles comprise ceramic-coated metal macro-particles.

17. The system of claim 15, wherein the macro-particles comprise metal-coated ceramic macro-particles.

18. The system of claim 1, further comprising:
    a stirring mechanism disposed within the macro-particles.

19. The system of claim 18, wherein the stirring mechanism includes grains capable of moving through the macro-particles upon agitation of the system.

20. The system of claim 18, wherein the stirring mechanism is coupled to the housing inner peripheral surface.

21. The system of claim 20, wherein the stirring mechanism is a component configured to mechanically stir the macro-particles.

* * * * *